United States Patent Office 3,586,652
Patented June 22, 1971

3,586,652
TACK AND GREEN STRENGTH IMPROVED IN EPDM/NATURAL RUBBER BLENDS BY ADDITION OF SILYLAMINE
Parviz Hamed, Akron, Ohio, assignor to The B. F. Goodrich Company, New York, N.Y.
No Drawing. Filed Nov. 3, 1969, Ser. No. 873,482
Int. Cl. C08c 9/08
U.S. Cl. 260—5                                              3 Claims

ABSTRACT OF THE DISCLOSURE

Ethylene-propylene-nonconjugated diene terpolymers are elastomeric materials with outstanding resistance to ozone. This is a plus property favoring their use in pneumatic tires, but balancing properties of low building tack and green strength weigh against such use. Blends of EPDM and natural rubber (NR) have a degree of tack and green strength and these properties are further enhanced by the addition of an aminoalkyl trialkoxy silane.

BACKGROUND OF THE INVENTION

The ethylene-propylene-diene terpolymers, known as EPDM rubbers, are highly saturated elastomers. Their high saturation makes them difficult to cure compatibly in sulfur cure with unsaturated rubbers, and when used either in combination with unsaturated rubbers, or alone, EPDM rubbers do not exhibit sufficient building tack and green strength to enable one to build an article such as a pneumatic tire from them. Tack is the ability of an uncured polymer to adhere to itself on slight contact pressure and to resist separation afterwards. A surface adhering to other materials, as well as to itself, possesses stickiness, not tack. Good tack development in a polymer requires surface adhesion (a surface property) and cohesive strength (a bulk property). The cohesive strength portion of tack is referred to as green strength. One solution to this problem is to provide a tackifying cement of polymer in solvent which is brushed, dipped or sprayed onto the EPDM compound and dries to leave a tacky surface. Often it is not desired to use a tackifying cement, and manufacturers would like to have EPDM gum stocks or compounds that exhibit tack in the manner that natural rubber gum and compound does. It is particularly desirable to use EPDM polymers in constructing synthetic rubber articles because in addition to the many rubbery qualities these polymers possess, they have unusual resistance to ozone. Low resistance to ozone is a weak spot in the qualities of natural rubber and unsaturated synthetic rubbers such as SBR and polybutadiene which are widely used in pneumatic tire manufacture today.

SUMMARY OF THE INVENTION

This invention is based on the fact that a blend of EPDM polymers and natural rubber may have a good degree of tack plus the discovery that the addition of a small amount of a recative silyl amine thereto greatly improves the green strength of the blend to levels which are completely satisfactory for such activities as making splices and stock turn ups in assembling parts to make a green pneumatic tire which can then be cured or vulcanized. Without the presence of the silyl amine, the blend does not have satisfactory green strength for building pneumatic tires.

Green strength is evaluated by milling a sheet of stock 0.075 inch thick. Test samples, 1″ x 0.075″ x 6″, are cut from these sheets and pulled at 20 inches per minute in an Instron tensile test machine. A continuous record is made of the strain elongation in percent and the stress applied in pounds which can be converted into pounds per square inch. The application of stress to produce strain is plotted to give a green strength curve. Elastomeric samples have yield points (the point on the stress-strain curve at which the stress-strain curve slopes downward as elongation increases) and break points (the point ont he stress-strain curve at which the sample snaps apart). The unvulcanized elastomer is said to have good green strength when the break stress ($T_B$) is higher than the minimum yield stress ($T_Y$). In other words, $T_B-T_Y$ should be a positive number. Conversely an elastomer has poor green strength when yield stress decays dircetly into (is about equal to) the breaking stress or $T_B-T_Y$ is a negative quantity. Stocks with the best potential for tire building will have a $T_B-T_Y$ value of 1 to 100. If $T_B-T_Y$ is greater than 100, the green strength is so great that the stock is too tough to mill and compound. Another criterion of good green strength is that the elastomer must show at least 400% elongation at break. The stress analysis can be run on loaded or unloaded stocks. Loading or reinforcing pigments such as carbon black have no effect on the shape of the stress-strain curve, but they do move the entire curve up to a higher level of stress. Some stocks would be too weak to give a curve if they were not initially loaded, therefore in the study of this invention only loaded, unvulcanized elastomers have been considered.

In the art of compounding elastomeric materials, particularly for manufacture of pneumatic tires, tack is a singularly important property. The stock must have quick grab when plies are laid; repeat tack when plies are replaced or turned up; high strength tack when beads are seated. Furthermore, the stock must accommodate to long term low stress as when beads must be held tightly in storage of a green tire, and to short term high stress to hold splices during lifting of the green tire into the mold.

In spite of its importance to the tire building art, tack is not yet satisfactorily evaluated quantitatively. Many factors react simultaneously to give one skilled in the art an overall impression of tack. At this time, undesirable as it is, then hand tack test by an experience person is the most reliable test available. In performing the "Quick Tack" test the evaluator takes two pieces of the test material 2″ x 6″ x 0.060″ approximately, reinforced with square woven fabric and touches them together lightly and rapidly over their entire area. The pieces must immediately adhere together with sufficient force to support their own weight when the assembly is held so that one piece is hanging down completely unsupported except by its "cling" to its mating piece. This material is rated "Good" if the lower piece does not peel away while supporting its own weight. It is rated "Poor" if the lower piece peels away in five minutes. Two similar pieces are lightly pressed together, held together for one second by their "cling" attraction, then pulled apart. The degree of pull is the measure of tack. A hard pull, at one inch per minute of approximately 25–40 p.s.i. is called "Good." An easy pull of 10–15 p.s.i. is rated "Poor." A material has to pass the "Quick Tack" evaluation in order to qualify for this "Hand Pull" evaluation. When a material has passed the "Hand Pull" evaluation, the test pieces are touched together again with light pressure over their entire areas and they must again adhere firmly as in the original "Quick Tack" evaluation. The step is called the "Repeat Tack" test.

Natural rubber possesses inherent tack and green strength that have made it usable in construction of pneumatic tires with textile cord reinforcing plies for many years. Manufacturers favor the development of manmade rubbers to replace natural rubber if possible, so that they will be forced from the problems that arise when a large share of natural rubber production becomes unavailable for natural, economic, military or political reasons. Synthetic rubbers, some with certain properties superior to those of natural rubber for use in tires have become available, but a common shortcoming of these synthetic rubbers in comparison to NR is their lack of building tack and its component, green strength. The EPDM polymers, for example, have excellent ozone resistance—a point in which NR is weak. Naturally, manufacturers want to make EPDM tires, but they are blocked in this desire, mainly by the material's lack of tack. Ways of adding tack and green strength qualities to EPDM without detracting from its ozone resistance are being actively sought.

Tack may also be evaluated on an instrument that places exactly known areas of test materials in opposition under a determined load for a determined time, followed by automatic separation at a constant rate with an indication of the maximum force required for separation. The tack result is expressed in terms of force per unit area.

Areas of sample to be placed in contact are determined in a simple and convenient fashion by preparing the specimens as narrow strips of identical width, mounting them with the ends held in clamps disposed with their axes at right angles, and moving the clamps toward one another to bring the test surfaces in contact. Width of the specimens is maintained at the desired value by cutting them from a sheet of material with a cutting die having parallel edges the proper distance apart. The contact area is the square of the distance between the cut edges of the specimen strips.

The instrument has a weight for holding the tacky surfaces in contact before the measurement, a timer for controlling removal of the weight load and for starting application of the separating force to one of the sets of clamps after the determined interval of contact, and a spring balance for indicating the separating force on the other set of clamps. This device is employed to evaluate tack in the studies made during development of the instant invention. These results are referred to as machine tack and are expressed in p.s.i.

DETAILED DESCRIPTION OF THE INVENTION

The EPDM polymers employed in the compounds of this invention are prepared following the teachings of prior art patents noted below. These terpolymer rubbers are terpolymers of ethylene, propylene and a non-conjugated polyene. The polyene is usually a diene or a triene. The manufacture of these terpolymer rubbers is well-known to those skilled in the art. The polyenes are usually polyunsaturated monocyclic, bicyclic, tricyclic or acyclic hydrocarbons. In such terpolymers the non-conjugated polyene usually ranges from 0.5 to 15 percent of the weight of the terpolymer, and the ethylene-to-propylene weight ratio ranges from 20:80 to 80:20.

Examples of terpolymer rubbers which may be used in the stocks being blended are given in U. S. Patents 2,933,480; 3,000,866; 3,000,867; 3,063,973; 3,093,620; 3,093,621 and 3,136,739, in British Patent 880,904, and in Belgian Patent 623,698. The polyenes most commonly used in such terpolymers in present commercial practice are dicyclopentadiene (more accurately termed cyclopentadiene dimer), 1,4-hexadiene, methylenenorbornene, 5-ethylidene-2-norbornene and 1,5-cyclooctadiene. Other polyenes which can be used include alloocimene, methyl cyclopentadiene dimer, etc. Terpolymers made with dicyclopentadiene are exemplified in U.S. 3,000,866 and 3,136,739 and in British Patent 880,904. The use of 1,4-hexadiene is exemplified in 2,933,480. The use of methylenenorbornene (actually 5-methylene-2-norbornene) is exemplified in U.S. 3,093,621. The use of 1,5-cyclooctadiene is exemplified in Belgian Patent 623,698. Examples of such commercial terpolymers are those available under the trademarks Royalene, Nordel, Vistalon and Dutral S70 made with dicyclopentadiene, 1,4-hexadiene, methylene-norbornene and 1,5-cyclooctadiene, respectively, as the third monomer.

The polymers are made by direct polymerization of ethylene, propylene and a diene monomer using conventional solution polymerization techniques with vanadium salts and aluminum alkyls as coordination catalysts as described in the patents listed above.

A mixture of ethylene and propylene in about equimolecular proportions in the terpolymer gives rubberlike material. As the proportion of ethylene is increased, plasticity of the product is lowered. Higher than 80% by weight of ethylene in the product gives an undesirable material.

In a typical preparation of a terpolymer of ethylene, propylene and 1,4-hexadiene, a catalyst mixture is prepared by heating a 25% by weight solution of 0.075 mol aluminum triisobutyl and 0.33 mol of decene-1 in tetrachloroethylene to boiling under reflux and nitrogene to form aluminum tridecyl. Aluminum chloride (0.038 mol) is dissolved in the product solution under nitrogen at 100° C. and the mixture is cooled to room temperature. One hundred milliliters of this cooled solution is added to 0.005 mol of vanadyl trichloride in 2 liters of tetrachloroethylene in a polymerization vessel. An ethylene-propylene feed containing 75 mol percent propylene is introduced at 2 liters per minute into catalyst solution. Simultaneously, 0.20 mol of 1,4-hexadiene in 90 ml. of tetrachloroethylene is added. Remaining diene solution is added dropwise continuously as polymerization proceeds. After 2 minutes of polymerization the ethylene-propylene feed is changed to 50 mol percent polypropylene. Temperature is maintained at 30° C. for the 2 hour polymerization period. Terpolymer is isolated from solution by precipitation with n-butanol. The precipitate is slurried with acetone, dried and washed. This material is extracted with benzene and terpolymer is recovered by reprecipitation, slurrying, washing and drying as just described. The elastomeric terpolymer contains 30 weight percent propylene, 2.5 weight percent diene (iodine number 7.5) and 67.5% ethylene.

Proportions of propylene, ethylene and diene in the polymers can be varied by changing charging ratios and/or catalyst concentration.

The reactive silylamines which are found valuable in the practice of this invention are selected from the class which has the formula

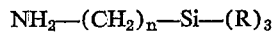

wherein $n$ is a whole number from 1 to 5, and R is an alkyl or alkoxy group having from 1 to 4 carbon atoms inclusive or a monocyclic aryl hydrocarbon. Said R groups may be the same or different in any combination of three of the aforesaid groups. Representative compounds of this class include trimethylsilylethyl amine, triethoxysilylpropyl amine, trimethoxysilylbutyl amine, tributoxsilylmethyl amine, trimethsilylpropyl amine, methyldiethoxysilylethyl amine, methyldiethoxysilylbutyl amine, dimethylpropoxy silylpropyl amine, trimethylsilylmethyl pentyl amine, diphenyl methylsilylmethyl amine and the like. The most preferred to these silyl amines are the alkoxysilylpropyl amines which have the empirical formula

where R is an alkyl group such as methyl, ethyl, propyl and the like. These preferred silyl amines are prepared by the reaction of a γ-chloropropylalkoxysilane with ammonia under pressure at elevated temperatures as described in U.S. Pat. No. 3,832,754. In addition to the monoamines, as illustrated by the formula, bis- and tris-amines can be made similarly, and will serve the purposes of the invention.

Other silylamines useful in the practice of this invention may be made by reaction of the proper halomethylsilane ($R_3SiCH_2X$) and ammonia where X is chlorine or bromine and $R_3$ may be any combination of alkyl, aryl or alkoxy groups as shown by Noll et al., "Journal American Chemical Society," vol. 73 (1951), pp. 3867–3871, and from trimethylchlorosilane by a Grignard reaction, malonic ester synthesis and further steps as described by Sommer et al., "Journal American Chemical Society," vol. 73 (1951), pp. 5130–5134.

The silylamine is preferably added to the blend of EPDM and NR in the amount of 0.1 to 5.0 parts by weight per 100 parts combined EPDM and NR. The range of EPDM to NR is preferably 50 to 75 parts EPDM to 50 to 25 parts NR, the total of the two equaling 100 parts. NR has natural tack and green strength, hence when higher levels of NR are used, the lower range of silylamine additive is preferred.

The natural rubber stocks employed in this invention are those gum stocks available and well known in the tire building art. Cure compounding ingredients such as sulfur, accelerators, reinforcing pigments, retarders, lubricants, fillers and the like are well known to the compounders in the art and available on the market.

The polymers and compounding ingredients are easily mixed in standard rubber mixing machinery such as Banbury machines or rubber mixing mills.

Stocks are sheeted to 0.075" thickness and press cured 40' at 302° F.

EXAMPLES

Compounds are prepared according to the following recipes. The EPDM terpolymer is a commercial one known as Nordel 1070, a product of E. I. du Pont and Co. It has 65 mol percent ethylene, 2.5 mol percent 1,4-hexadiene and DSV of 2.3.

Triethoxysilylpropylamine is available on the market as Silane A 1100, a product of Union Carbide Corporation.

| Material | Parts by weight | |
|---|---|---|
| | A | B |
| EPDM polymer, 65 mol percent ethylene | 60 | 60 |
| Natural rubber | 40 | 40 |
| Carbon black | 45 | 45 |
| Arc silica (Hi-Sil) | 15 | 15 |
| Zinc oxide | 10 | 10 |
| Paraffinic processing oil | 10 | 10 |
| p-Nonylphenol formaldehyde resin | 10 | 10 |
| Dicumyl peroxide | 1.5 | 1.5 |
| Sulfur | 1.5 | 1.5 |
| N-cyclohexylbenzylsulfenamide | 1.0 | 1.0 |
| γ-Aminopropyl tri-ethoxy silane | | 2.0 |

Uncured samples are submitted to the following tests:

| Test | Results | |
|---|---|---|
| | A | B |
| Machine: Tack, fresh, average of 3 (p.s.i.) | 45 | 59 |
| Machine: Tack, aged 1 week in stock liner at room temp. (p.s.i.) | 32 | 63 |
| Adhesion to an EPDM tread stock at room temp., pounds | 120 | 105 |
| Aged at 212° F. for 3 hrs., pulled at 212° F., pounds | 50 | 45 |
| Green strength: $T_B - T_Y$ (p.s.i.) | −2.0 | +99 |
| Percent ultimate elongation | 760 | 810 |

The compounds are cured 60 minutes at 302° F. for physical tests.

| Test | Results | |
|---|---|---|
| | A | B |
| Tensile (p.s.i.) | 2,500 | 2,700 |
| Percent elongation | 710 | 640 |
| 300% modulus (p.s.i.) | 600 | 950 |

Cured compound B is furthermore found to be adherable to tire cord structures of nylon, fiberglass, rayon and polyester. These materials are the tire cords used in premium, original equipment, and replacement tire constructions today. Tire cords of 2200/3 (2200 denier, 3 ply) rayon, and 1680/2 nylon are teated by dipping them into adhesive dip solutions. The adhesive is dried on the cords at 410° F. for one minute.

Treated cord and carcass stock samples of polymers A and B are placed in a standard H mold, cured 45 minutes at 325° F. and tested for H-adhesion according to ASTM 2138–62T at room temperature (RT) and at 212° F.

| | Pounds | |
|---|---|---|
| | A | B |
| Adhesion to nylon cord (RT) | 35 | 33.1 |
| Adhesion to nylon cord (212° F.) | 20.1 | 20.1 |
| Adhesion to rayon cord (RT) | 43.8 | 43.5 |
| Adhesion to rayon cord (212° F.) | 29.9 | 24.8 |

I claim:
1. In the method of obtaining tack and green strength by blending a major proportion of EPDM and a minor proportion of natural rubber elastomers, the improvement comprising adding to 100 parts of said blended elastomers from 0.1 to 10.0 parts of an aminosilane of the formula

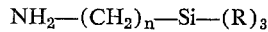
$$NH_2-(CH_2)_n-Si-(R)_3$$

wherein $n$ is a whole number from 1 to 5 and R is an alkyl or alkoxy group having from 1 to 4 carbon atoms inclusive, or a monocyclic aryl hydrocarbon and said R groups may be the same or different.

2. The method of claim 1 wherein the said aminosilane is γ-aminopropyl triethoxy silane.

3. Compositions of matter comprising in combination of weight parts from 50 to 75 parts EPDM and 50 to 25 parts natural rubber with the total being 100 parts plus 1.0 to 5.0 parts of a reactive silylamine of the formula

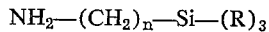
$$NH_2-(CH_2)_n-Si-(R)_3$$

wherein $n$ is a whole number from 1 to 5 and R is an alkyl or alkoxy group having from 1 to 4 carbon atoms inclusive, or a monocyclic aryl hydrocarbon and said R groups may be the same or different.

References Cited

UNITED STATES PATENTS

| 3,376,188 | 4/1968 | Clayton et al. | 161—193 |
| 3,378,508 | 4/1968 | Hamed et al. | 260—5 |
| 3,484,333 | 12/1969 | Vanderbilt | 161—93 |
| 3,492,370 | 1/1970 | Wirth | 260—889 |

MURRAY TILLMAN, Primary Examiner

J. SEIBERT, Assistant Examiner

U.S. Cl. X.R.

152—357; 156—110A; 161—193, 206, 208; 260—827